United States Patent
Luo

(10) Patent No.: US 11,928,260 B2
(45) Date of Patent: Mar. 12, 2024

(54) CONTROL METHOD AND ELECTRONIC DEVICE HAVING TOUCH POSITIONS WITH DIFFERENT PRESSURE VALUE

(71) Applicant: VIVO MOBILE COMMUNICATION CO., LTD., Guangdong (CN)

(72) Inventor: Chuangjie Luo, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/958,613

(22) Filed: Oct. 3, 2022

(65) Prior Publication Data

US 2023/0027925 A1   Jan. 26, 2023

Related U.S. Application Data

(63) Continuation of application No. PCT/CN2021/085544, filed on Apr. 6, 2021.

(30) Foreign Application Priority Data

Apr. 13, 2020   (CN) .......................... 202010286106.8

(51) Int. Cl.
  *G06F 3/01*     (2006.01)
  *G06F 3/04886*  (2022.01)
(52) U.S. Cl.
  CPC .......... *G06F 3/016* (2013.01); *G06F 3/04886* (2013.01)
(58) Field of Classification Search
  CPC ...................................................... G06F 3/016
  USPC ........................................................ 345/173
  See application file for complete search history.

(56) References Cited

U.S. PATENT DOCUMENTS

| | | | |
|---|---|---|---|
| 2008/0024459 A1 | 1/2008 | Poupyrev et al. | |
| 2014/0002346 A1* | 1/2014 | Weddle | G06T 1/60 |
| | | | 345/156 |
| 2014/0132568 A1* | 5/2014 | Hirose | G06F 3/044 |
| | | | 345/175 |
| 2019/0025958 A1 | 1/2019 | Tokutake | |

FOREIGN PATENT DOCUMENTS

| | | |
|---|---|---|
| CN | 107656620 A | 2/2018 |
| CN | 109445600 A | 3/2019 |
| CN | 110764675 A | 2/2020 |
| CN | 111506191 A | 8/2020 |
| EP | 2733576 A1 | 5/2014 |

* cited by examiner

*Primary Examiner* — Long D Pham

(74) *Attorney, Agent, or Firm* — Price Heneveld LLP

(57) ABSTRACT

A control method and an electronic device are provided. The method includes: receiving a first input for a function control in a case that the function control is displayed in a first manner; and displaying, in response to the first input, the function control in a second manner, outputting a first current at a first position of the function control, and outputting a second current at a second position of the function control, where an input position of the first input includes at least one of the first position and the second position.

15 Claims, 5 Drawing Sheets

CONTROL METHOD AND ELECTRONIC DEVICE HAVING TOUCH POSITIONS WITH DIFFERENT PRESSURE VALUE

CROSS-REFERENCE TO RELATED APPLICATIONS

This application is continuation application of PCT International Application No. PCT/CN2021/085544 filed on Apr. 6, 2021, which claims the priority of Chinese Patent Application No. 202010286106.8 filed in China on Apr. 13, 2020, the entire contents of which are hereby incorporated by reference in their entireties.

TECHNICAL FIELD

The present invention relates to the field of communication technologies, and in particular, to a control method and an electronic device.

BACKGROUND

With the development of touchscreen technology, more and more function controls can be displayed on a display screen of an electronic device. However, a user can only interact visually with a function control displayed on an existing electronic device. For example, the user determines a display position of the function control on a display screen by viewing the display screen, and then touches the function control at the display position to switch a display manner of the function control. It can be seen that the user needs to watch the electronic device to operate, which makes it inconvenient for the user to control the operation at places and times that need attention, such as when crossing a road.

Therefore, there is a problem that the function control is inconvenient to use in the prior art.

SUMMARY

According to a first aspect, the embodiments of the present invention provide a control method, applied to an electronic device, the method including:

receiving a first input for a function control in a case that the function control is displayed in a first manner; and displaying, in response to the first input, the function control in a second manner, outputting a first current at a first position of the function control, and outputting a second current at a second position of the function control, where an input position of the first input includes at least one of the first position and the second position.

According to a second aspect, the embodiments of the present invention further provide an electronic device, including:

a first receiving module, configured to receive a first input for a function control in a case that the function control is displayed in a first manner; and a first display module, configured to: display, in response to the first input, the function control in a second manner, output a first current at a first position of the function control, and output a second current at a second position of the function control, where an input position of the first input includes at least one of the first position and the second position.

According to a third aspect, the embodiments of the present invention further provide an electronic device, including: a processor, a memory, and a computer program stored in the memory and executable on the processor, where the computer program, when executed by the processor, implements the steps of the foregoing control method.

According to a fourth aspect, the embodiments of the present invention further provide a computer-readable storage medium, storing a computer program, where the computer program, when executed by a processor, implements the steps of the foregoing control method.

According to a fifth aspect, the embodiments of the present invention further provide an electronic device, configured to perform the steps of the foregoing control method.

In the embodiments of the present invention, a first input for a function control is received in a case that the function control is displayed in a first manner. In response to the first input, the function control is displayed in a second manner, a first current is outputted at a first position of the function control, and a second current is outputted at a second position of the function control. An input position of the first input includes at least one of the first position and the second position.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings according to such accompanying drawings without creative efforts.

DETAILED DESCRIPTION

The following clearly describes the technical solutions in embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts all fall within the protection scope of the present invention.

A control method provided by the embodiments of the present invention is mainly applied to an electronic device. The electronic device may be a mobile terminal, and is used for providing a function control with a tactile sensation, so that the function control can give a tactile feedback to a user, thereby making it convenient for the user to control the function control of the electronic device.

The mobile terminal may be a mobile phone, a tablet personal computer, a laptop computer, a personal digital assistant (PDA for short), a mobile Internet device (MID), a wearable device, or the like.

Figure 1:
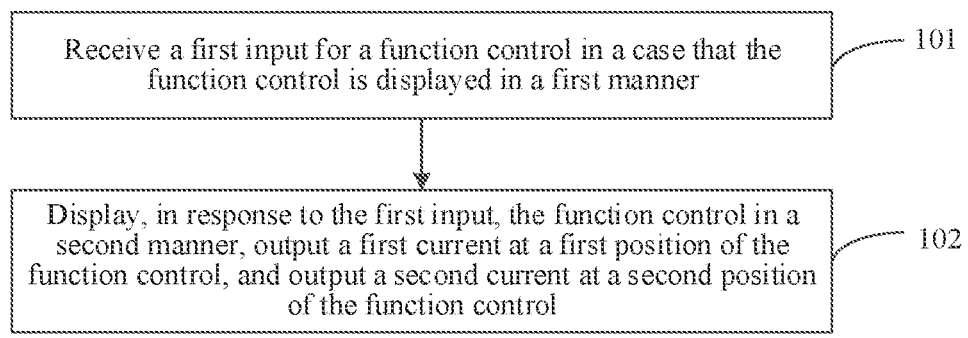
FIG. 1 is a flowchart of a control method according to an embodiment of the present invention.

FIG. 1 is a flowchart of a control method according to an embodiment of the present invention. As shown in FIG. 1, the control method includes the following steps:

Step 101: Receive a first input for a function control in a case that the function control is displayed in a first manner.

The mobile terminal may set a function control for a certain function. The function control may include at least two display manners, namely a first manner and a second manner respectively, to indicate a function state of the function control. The function control may be displayed on a specified operation interface.

The mobile terminal may set a function control for a certain function on a setting interface. The function control may be a switch control, and the function control may include at least a function state in which the function is turned on and a function state in which the function is turned off. Correspondingly, the mobile terminal may set a first manner and a second manner for the function control. The first manner may indicate that the function control is in the function state in which the function is turned on, and correspondingly, the second manner may indicate that the function control is in the function state in which the function is turned off. Alternatively, the first manner may indicate that the function control is in the function state in which the function is turned off, and correspondingly, the second manner may indicate that the function control is in the function state in which the function is turned on. The mobile terminal may receive an input for the function control, and may select the function state of the function control according to the input. Correspondingly, the mobile terminal may control the display manner of the function control according to the function state of the function control.

For example, the mobile terminal may set a function control for a Bluetooth function on the setting interface. The function control of the Bluetooth function may include a function state in which the Bluetooth is turned on and a function state in which the Bluetooth is turned off. Correspondingly, the mobile terminal may set a first manner and a second manner for the function control. The first manner may indicate that the function control is in the function state in which the Bluetooth is turned on, and correspondingly, the second manner may indicate that the function control is in the function state in which the Bluetooth is turned off. Alternatively, the first manner may indicate that the function control is in the function state in which the Bluetooth is turned off, and correspondingly, the second manner may indicate that the function control is in the function state in which the Bluetooth is turned on. The mobile terminal may receive an input for the function control of the Bluetooth function, and may select the function state of the function control of the Bluetooth function according to the input. Correspondingly, the mobile terminal may control the display manner of the function control according to the function state of the function control.

Figure 2:
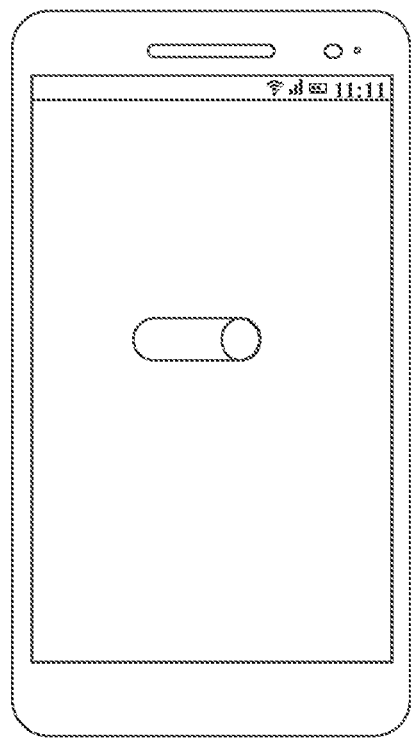
FIG. 2 is a display effect diagram 1 of a function control.
Figure 3:
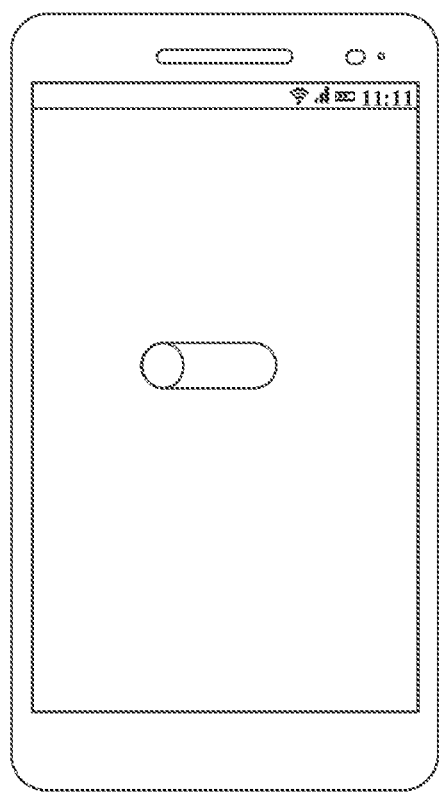
FIG. 3 is a display effect diagram 2 of a function control.

In an optional embodiment, FIG. 2 is a display effect diagram 1 of a function control. As shown in FIG. 2, the function control is in the first manner, and the first manner indicates that the function control is in the function state in which the function is turned on. FIG. 3 is a display effect diagram 2 of a function control. As shown in FIG. 3, the function control is in the second manner, and the second manner indicates that the function control is in the function state in which the function is turned off.

In an optional embodiment, the function control may further include a function state in which the function is vacant. For example, the function control is a switch control that simulates a high and low switch button having a shape of triangular prism. The switch control may include the function state in which the function is vacant. The function state in which the function is vacant may be understood as an intermediate state between the function state in which the function is turned on and the function state in which the function is turned off. That is, the mobile terminal neither turns on the function nor turns off the function, and the function is in a vacant state. Correspondingly, a third manner may be further set for the function control, and is used for indicating that the function control is in the function state in which the function is vacant, so as to perform a switching indication on the function state of the function control.

In a case that the function control is displayed in the first manner, the first input for the function control is received. An input position of the first input includes at least one of a first position and a second position.

The first position and the second position may be display positions in a display region of the function control. The display region of the function control may include only two display positions, and may alternatively include other display positions while including the first position and the second position. The display positions may be distributed at intervals or continuously on the display region of the function control, which is not specifically limited herein.

In an optional embodiment, the display region includes at least the first position and the second position distributed at intervals in a target direction. The fact that the display region includes at least the first position and the second position distributed at intervals in a target direction may be understood as that the display region includes at least two display positions. In other words, the display region includes at least two display positions sequentially distributed at intervals in the target direction, and the first position and the second position are distributed in the at least two display positions according to the target direction.

The target direction may be a left-to-right direction, a right-to-left direction, or other directions, and is not specifically limited herein. In the following embodiments, detailed descriptions are made using an example in which the target direction is the right-to-left direction.

The first position and the second position are distributed in the at least two display positions according to the target direction, and an interval between the first position and the second position may be set according to an actual situation. For ease of operation, the interval between the first position and the second position may be set relatively large. Optionally, the first position and the second position may be arranged on opposite sides in the display region.

The first position may be understood as a display point in the display region, or may be understood as a display sub-region in the display region. Correspondingly, the second position may be understood as a display point in the display region, or may be understood as a display sub-region in the display region. In the following embodiments, descriptions are made using an example in which the first position and the second position are both display sub-regions.

In addition, the first position may be defined as a position for turning on the function, and correspondingly, the second position may be defined as a position for turning off the function. In this case, if the first manner indicates that the function control is in the function state in which the function is turned on, the first input may be a touch input for the second position or a slide input from the first position to the second position, to switch the display manner to the second manner. If the first manner indicates that the function control is in the function state in which the function is turned off, the first input may be a touch input for the first position or a slide input from the second position to the first position, to switch the display manner to the second manner.

Figure 4:
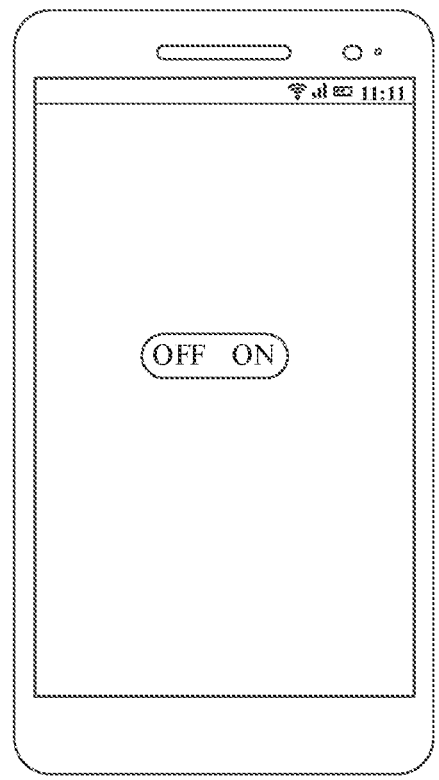
FIG. 4 is a schematic diagram of a setting interface of a mobile terminal.

In an optional embodiment, the target direction is the right-to-left direction, and the first position and the second position may be arranged on opposite sides in the display region. FIG. 4 is a schematic diagram of a setting interface of a mobile terminal. As shown in FIG. 4, the setting interface of the mobile terminal includes the function control, and the display region of the function control includes the at least two display positions from right to left, namely the first position and the second position respectively. A tactile sensation of the function control is designed as a horizontal high and low switch. The first position may be arranged on the right side in the target direction, and may be defined as an "ON" side. When a height represented at the first position is lower than a height represented at the second position, it may be represented that the function control is in the function state in which the function is turned on. The second position may be arranged on the left side in the target direction, and may be defined as an "OFF" side. When the height represented at the second position is lower than the height represented at the first position, it may be represented that the function control is in the function state in which the function is turned off.

Step 102: Display, in response to the first input, the function control in a second manner, output a first current at a first position of the function control, and output a second current at a second position of the function control.

An input position of the first input includes at least one of the first position and the second position.

In this step, in response to the first input, outputs of currents at the first position and the second position are controlled by a current output mode associated with the second manner while the function control is displayed in the second manner.

Specifically, for one type of switch control, the function control may include at least two function states, each display manner of the function control has a current output mode associated with the display manner, and the current output modes associated with the display manners may be different to distinguish different display manners of the function control.

For example, the current output mode associated with the second manner may be to output the first current at the first position of the function control and output the second current at the second position of the function control. The current output mode associated with the first manner may be to output a fifth current at the first position of the function control and output a sixth current at the second position of the function control. The current output mode associated with the third manner may be to output a third current at the first position of the function control and output a fourth current at the second position of the function control.

Furthermore, for different types of function controls, the current output modes associated with the same display manner of the function controls may alternatively be different to distinguish the types of the function controls. The function control takes a switch control as an example. There are a plurality of types of switch controls, such as a switch control that simulates the high and low switch button having the shape of triangular prism, a switch control that simulates a left and right toggle switch button, and a switch control that simulates a rebound switch button in a single button row. For different types of switch controls, the current output modes of the same display manner of the switch controls may alternatively be different.

For example, if the function control is the switch control that simulates the high and low switch button having the shape of triangular prism, the first current may be equal to the second current in the second manner; and if the function control is the switch control that simulates a rebound switch button in a single button row, the second current may be less than the first current in the second manner. Certainly, alternatively, the current output mode associated with the second manner may be set for one type of function control, and the first current is made less than the second current in the current output mode.

Therefore, for a function control, current output modes associated with all display manners of the function control may be determined first. Then, a target current output mode is determined from the current output modes according to a present display manner of the function control, and the outputs of currents at the first position and the second position are controlled according to the target current output mode.

It is to be noted that, for ease of description, in the following embodiments, the description is made using an example in which the function control is the switch control that simulates a rebound switch button in a single button row.

Furthermore, in order to make the user have a fluctuating tactile sensation at the first position and the second position when touching the function control on a screen, a difference between an output current corresponding to the first position and an output current corresponding to the second position is greater than a first current threshold.

In the implementation process, current wiring may be arranged at each of the at least two display positions to control an output of a current at the display position, thereby making the user have a tactile sensation. Meanwhile, outputs of currents with different intensities at different display positions may be controlled according to the target current output mode, so that the user may have a fluctuating tactile sensation when touching the function control on the screen.

Specifically, when the present display manner of the function control is the second manner, the difference between the first current and the second current may be controlled to be greater than the first current threshold, so that the fluctuating tactile sensation is generated when pressing at the first position and the second position respectively. The first current threshold may represent a lowest tactile height formed between the first position and the second position.

Figure 5:
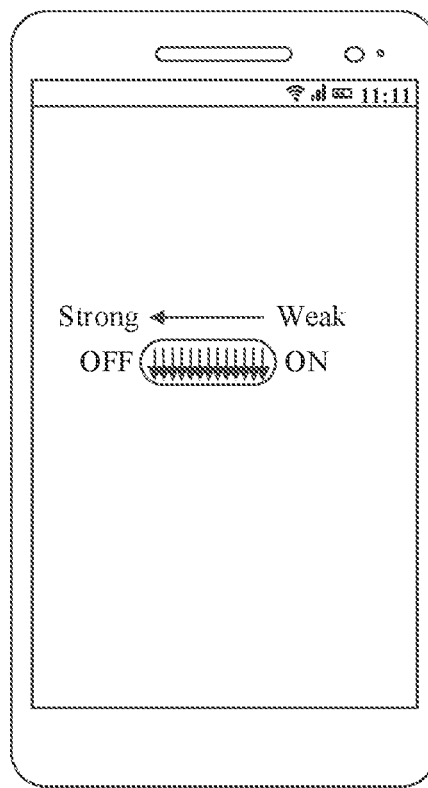
FIG. 5 is a schematic diagram of an output current at each display position in a display region of a function control.

FIG. 5 is a schematic diagram of an output current at each display position in a display region of a function control. As shown in FIG. 5, the mobile terminal may include a plurality of display positions, and the mobile terminal controls the output of the current on the current wiring arranged at each display position in the display region according to the target current output mode, so that the output current at each display position changes in an upward trend according to the target direction.

Furthermore, the first manner and the second manner may be two opposite display manners. For example, the first manner may indicate that the function control is in the function state in which the function is turned on, and the second manner may indicate that the function control is in the function state in which the function is turned off. Correspondingly, the current output mode associated with the first manner, that is, a first current output mode, and the current output mode associated with the second manner, that is, a second current output mode may also be set as two opposite current output modes. For example, in the current output mode associated with the first manner, the output current corresponding to the first position, that is, the first current is less than the output current corresponding to the second position, that is, the second current. In the current output mode associated with the second manner, the output current corresponding to the first position, that is, the fifth current is greater than the output current corresponding to the second position, that is, the sixth current.

When the display manner of the function control is the first manner, the target current output mode is the first current output mode, and when the display manner of the function control is the second manner, the target current output mode is the second current output mode.

If the display manner of the function control is the first manner, the first manner indicating that the function control is in the function state in which the function is turned on, the mobile terminal controls the output of the current at the display position in the display region of the function control according to the first current output mode. As shown in FIG. 5, in this case, the output current corresponding to the "ON" side is less than the output current corresponding to the "OFF" side, so that the screen outputs a stronger tactile stimulus on the "OFF" side than that on the "ON" side, which indicates that a horizontal plane on the "ON" side is lower. In this way, when a user's finger approaches the function control but does not touch the function control to form a pressure, it is easier for the user to feel the current when the finger approaches the "OFF" side, thereby forming a tactile sensation; while when the finger approaches the "ON" side, because the outputted current is a weak current, it is more difficult for the user to have a tactile sensation generated on the "ON" side. In this way, the user can feel a turn-on tactile sensation of the real switch button.

In a case that the first input for the function control is received, in response to the first input, the function control is displayed in the second manner, the second manner indicating that the function control is in the function state in which the function is turned off, and the mobile terminal controls the output of the current at the display position in the display region of the function control according to the second current output mode. In this case, the output current corresponding to the "ON" side is greater than the output current corresponding to the "OFF" side, so that the screen outputs a stronger tactile stimulus on the "ON" side than that on the "OFF" side, which indicates that a horizontal plane on the "OFF" side is lower. In this way, when the user's finger approaches the function control but does not touch the function control to form a pressure, it is easier for the user to feel the current when the finger approaches the "ON" side, thereby forming a tactile sensation; while when the finger approaches the "OFF" side, because the outputted current is a weak current, it is more difficult for the user to have a tactile sensation generated on the "OFF" side. In this way, the user can feel a turn-off tactile sensation of the real switch button.

In an optional embodiment, the current output mode associated with the first manner, that is, the first current output mode is that the output currents at the at least two display positions in the display region change in an upward trend according to the target direction; and the current output mode associated with the second manner, that is, the second current output mode is that the output currents at the at least two display positions in the display region change in a downward trend according to the target direction.

The number of display positions in the display region may be more than two. In the display region, at least one third position may be further sequentially arranged at intervals between the first position and the second position according to the target direction.

The first current output mode is that the output currents at the display positions change in an upward trend according to the target direction; and the second current output mode is that the output currents at the display positions change in a downward trend according to the target direction.

The changing in the upward trend or the changing in the downward trend may be changing according to a uniform gradient. For example, the display region includes the first position, the third position, and the second position, the output current between the first position and the third position changes according to a first gradient, and the output current between the third position and the second position also changes according to the first gradient. The changing in the upward trend or the changing in the downward trend may alternatively be changing according to a non-uniform gradient. For example, the output current between the third position and the first position changes according to the first gradient, and the output current between the third position and the second position changes according to a second gradient, where the first gradient is different from the second gradient.

In this way, by densely arranging the plurality of display positions in the display region of the function control, and controlling the output currents at the display positions to change in a trend, it can be ensured that the output currents in the display region of the function control are distributed densely and regularly, thereby improving the tactile feedback of the function control.

Furthermore, the output currents at each adjacent two display positions in the at least two display positions, which are sequentially distributed at intervals according to the target direction, change according to the gradient of a preset curve. The change trend of the gradient of the preset curve according to the target direction is the same as the change trend of the output currents at the at least two display positions according to the target direction.

The gradient of the preset curve refers to a height-to-width ratio of a right triangle in a very small range on the preset curve, and when the gradient is larger, the angle is larger, and the slope is steeper.

The change trend of the gradient of the preset curve according to the target direction is the same as the change trend of the output currents at the at least two display positions according to the target direction. If the output currents at the at least two display positions change in an upward trend according to the target direction, the gradient of the preset curve also changes in an upward trend according to the target direction. If the output currents at the at least two display positions change in a downward trend according to the target direction, the gradient of the preset curve also changes in a downward trend according to the target direction.

Figure 6:
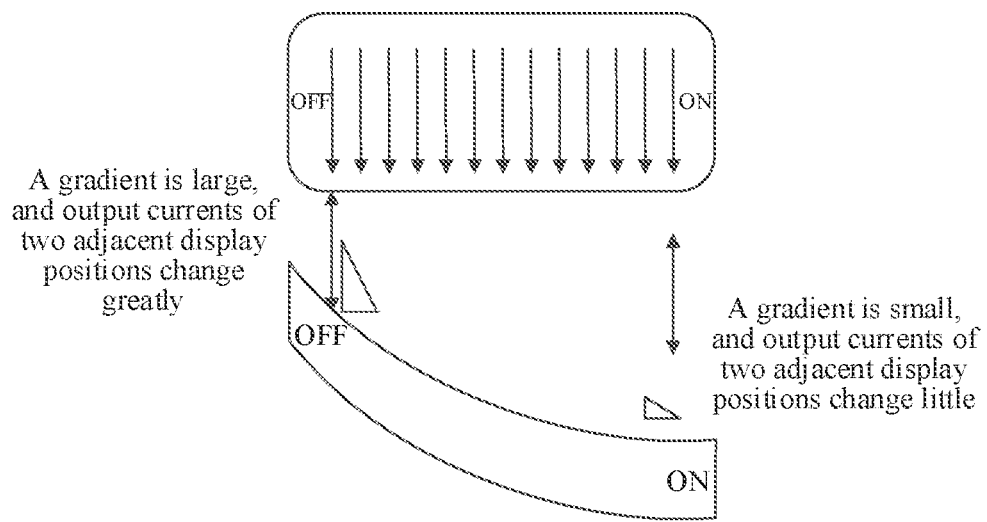
FIG. 6 is an effect diagram 1 of an output current at each display position in a display region of a function control.

The output currents at each adjacent two display positions in the at least two display positions, which are sequentially distributed at intervals according to the target direction, change according to the gradient of the preset curve. FIG. 6 is an effect diagram 1 of an output current at each display position in a display region of a function control. As shown in FIG. 6, a weak current is on the "ON" side, and a strong current is on the "OFF" side. The output currents at the at least two display positions change in an upward trend in the right-to-left direction, and the gradient of the preset curve also changes in an upward trend in the right-to-left direction. Moreover, the change of the output currents at two adjacent display positions is made large at a place where the gradient of the preset curve is large. That is, according to the right-to-left direction, the output current at the latter display position rises more rapidly relative to that at the former display position. And, the change of the output currents at two adjacent display positions is made small at a place where the gradient of the preset curve is small. That is, according to the right-to-left direction, the output current at the latter display position rises more slowly relative to that at the former display position. In this way, the change of the output current at each display position in the display region is more delicate, and a sense of radian is formed.

In this embodiment of the present invention, the first input for the function control is received in a case that the function control is displayed in the first manner. In response to the first input, the function control is displayed in the second manner, the first current is outputted at the first position of the function control, and the second current is outputted at the second position of the function control. The input position of the first input includes at least one of the first position and the second position.

In this way, by performing an input operation at the at least one of the first position and the second position of the function control, controlling the display manner of the function control to switch, and controlling outputs of currents at the first position and the second position of the function control, a user can have a tactile sensation at the first position and the second position when touching the function control on the screen, and the function control can give a tactile feedback to the user, which is convenient for the user to control the function control of the electronic device.

In addition, by determining the current output mode associated with the display manner of the function control, the output of the current at the display position in the display region of the function control is controlled according to the current output mode associated with the display manner. In this way, the output of the current at the display position in the display region of the function control can be controlled according to the current output mode associated with the display manner of the function control, so that the output current in the display region of the function control matches the display manner of the function control, thereby simulating the tactile sensation of the present function state of the function control.

It is to be noted that, the user may set a parameter for the first current threshold to set a tactile height of the function control, or may determine the first current threshold according to the type of a common switch control provided in the mobile terminal to determine the tactile height of the function control.

Optionally, in a case that the function control is displayed in the first manner, the mobile terminal may receive the first input for the function control, and control the display manner of the function control in response to the first input. Specifically, step 102 includes:

obtaining a first pressure value detected at the first position and a second pressure value detected at the second position in response to the first input; and displaying the function control in the second manner, outputting the first current at the first position of the function control, and outputting the second current at the second position of the function control, in a case that the second pressure value is greater than the first pressure value, and the second pressure value is greater than or equal to a first threshold.

The first input may be an operation of applying a pressure to the function control while the user's finger approaches or touches the function control.

Specifically, the mobile terminal detects the first input for the function control, and obtains the first pressure value detected at the first position and the second pressure value detected at the second position in response to the first input; and controls the display manner of the function control according to the first pressure value and the second pressure value.

According to the first pressure value and the second pressure value, there may be a plurality of control manners for controlling the display manner of the function control. For example, a control manner is to switch the display manner of the function control, keep the display manner of the function control, or control the display manner of the function control to be in the function state in which the function is vacant.

In an optional embodiment, in a case that the second pressure value is greater than the first pressure value, and the second pressure value is greater than or equal to the first threshold, the display manner of the function control is switched from the first manner to the second manner, the function control is displayed in the second manner, the first current is outputted at the first position of the function control, and the second current is outputted at the second position of the function control.

Optionally, after the obtaining a first pressure value detected at the first position and a second pressure value detected at the second position, the method further includes:

displaying the function control in a third manner, outputting a third current at the first position, and outputting a fourth current at the second position, in a case that the second pressure value is greater than the first pressure value, and the second pressure value is less than the first threshold, where the third current is equal to the fourth current.

In an optional embodiment, in a case that the second pressure value is greater than the first pressure value, and the second pressure value is less than the first threshold, if the first input is not completed, the display manner of the function control is switched to the third manner, the function control is displayed in the third manner, and the output of the current at the display position in the display region of the function control is controlled according to the current output mode associated with the third manner. That is, the third current is outputted at the first position, and the fourth current is outputted at the second position. If the first input is completed, the third manner is switched to the display manner of the function control before the first input, that is, the first manner.

In another optional embodiment, in a case that the second pressure value is less than or equal to the first pressure value, the display manner of the function control remains unchanged.

The first manner is used for indicating a first function state of the function control, the second manner is used for indicating a second function state of the function control, and the third manner is used for performing a switching indication on the function state of the function control.

For example, the function control is in the first manner, where the first manner is used for indicating that the function control is in the function state in which the function is turned on, that is, the "ON" side is low and the "OFF" side is high. If the user directly applies a pressure on the "OFF" side, and the applied pressure exceeds the pressure threshold of function switching, that is, the first threshold, the display manner of the function control is directly switched to the second manner, where the second manner is used for indicating that the function control is in the function state in which the function is turned off. That is, the display manner of the function control shown in FIG. 2 is switched to the display manner shown in FIG. 3.

Figure 7:
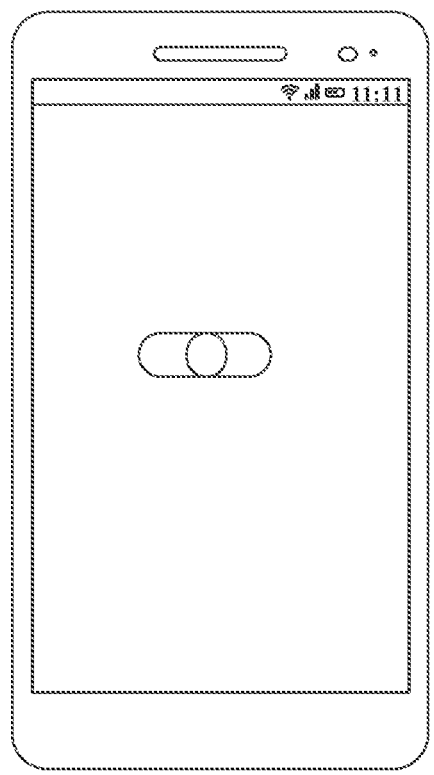
FIG. 7 is a display effect diagram 3 of a function control.

If the user applies a pressure on the "OFF" side, but the applied pressure does not exceed the pressure threshold of the function switching, that is, the first threshold, the display manner of the function control is switched to the third manner, where the third manner is used for indicating that the function control is in the function state in which the function is vacant. FIG. 7 is a display effect diagram 3 of the function control. As shown in FIG. 7, the function control is in the third manner.

Figure 8:
FIG. 8 is an effect diagram 2 of an output current at each display position in a display region of a function control.

FIG. 8 is an effect diagram 2 of an output current at each display position in a display region of a function control. As shown in FIG. 8, when the display manner of the function control is the third manner, the output current on the "ON" side, that is, the third current is equal to the output current on the "OFF" side, that is, the fourth current.

The third manner is further used for performing the switching indication on the function state of the function control. That is, when the display manner of the function control is the third manner, it may indicate that the pressure applied by the user on the "OFF" side is insufficient to meet the switching condition, and indicate that the user may apply a larger pressure on the "OFF" side if intending to implement the state switching.

In order to perform the switching indication in real time, the mobile terminal may control the function control to perform sliding display. When the pressure applied by the user on the "OFF" side gradually increases, the mobile terminal may control the function control to gradually slide toward the "OFF" side. When the pressure applied on the "OFF" side exceeds the first threshold, the function control is switched to the display manner shown in FIG. 3.

If the user completes the first input when the function control is in the third manner, the third manner is restored to the display manner of the function control before the first input, that is, restored to the display manner shown in FIG. 2.

If the user directly applies a pressure on the "ON" side, even if a great pressure is applied on the "ON" side, and the pressure is expanded to the "OFF" side through the screen, causing the pressure on the "OFF" side to exceed the first threshold, because the pressure on the "ON" side is greater than the pressure on the "OFF" side, the display manner of the function control is not switched, but the function control is still kept in the first manner, that is, the display manner of the function control shown in FIG. 2 is kept.

If the user applies a pressure at the third position between the "ON" side and the "OFF" side, the display manner of the function control is determined and controlled according to a pressure expanded to the "ON" side and a pressure expanded to the "OFF" side from the applied pressure through the screen.

It is to be noted that, the user may set a parameter for the first threshold to set a simulated force parameter of the function control, or may determine the first threshold according to the type of a common switch control provided in the mobile terminal to determine the simulated force parameter of the function control.

Optionally, the second current is less than the first current, and after the displaying, in response to the first input, the function control in a second manner, outputting a first current at a first position of the function control, and outputting a second current at a second position of the function control, the method further includes:

receiving a second input for the function control; and displaying, in response to the second input, the function control in the first manner, outputting a fifth current at the first position, and outputting a sixth current at the second position, where the fifth current is less than the sixth current.

In this embodiment, in a case that the display manner of the function control is the second manner and the first current is greater than the second current in the second current output mode associated with the second manner, a second input for the function control is received, where the second input is a touch input for the first position; or a slide input from the second position to the first position.

In response to the second input, the display manner of the function state is controlled.

Specifically, in a case that the first pressure value is greater than the second pressure value and the first pressure value is greater than or equal to a second threshold, the display manner of the function control is switched to the first manner. In addition, the output of the current at the display position in the display region of the function control is controlled according to the current output mode associated with the first manner. That is, the fifth current is outputted at the first position and the sixth current is outputted at the second position, where the fifth current is less than the sixth current.

In a case that the first pressure value is greater than the second pressure value and the first pressure value is less than the second threshold, if the second input is not completed, the display manner of the function control is controlled to be the third manner, and if the second input is completed, the third manner is restored to the display manner of the function control before the second input.

In a case that the first pressure value is less than or equal to the second pressure value, the display manner of the function control remains unchanged.

The first manner is used for indicating a first function state of the function control, the second manner is used for indicating a second function state of the function control, and the third manner is used for performing a switching indication on the function state of the function control.

For example, the function control is in the second manner at present, where the second manner is used for indicating that the function control is in the function state in which the function is turned off, that is, the "OFF" side is low and the "ON" side is high. If the user directly applies a pressure on the "ON" side, and the applied pressure exceeds the pressure threshold of the function switching, that is, the second threshold, the display manner of the function control is directly switched to the first manner, where the first manner is used for indicating that the function control is in the function state in which the function is turned on. That is, the display manner of the function control shown in FIG. 3 is switched to the display manner shown in FIG. 2.

If the user applies a pressure on the "ON" side, but the applied pressure does not exceed the second threshold of the function switching, the display manner of the function control is switched to the third manner, where the third manner is used for indicating that the function control is in the function state in which the function is vacant, as shown in FIG. 7.

The third manner is further used for performing the switching indication on the function state of the function control. That is, when the display manner of the function control is the third manner, it may indicate that the pressure applied by the user on the "ON" side is insufficient to meet the switching condition, and indicate that the user may apply a larger pressure on the "ON" side if intending to implement the state switching.

In order to perform the switching indication in real time, the mobile terminal may control the function control to perform sliding display. When the pressure applied by the user on the "ON" side gradually increases, the mobile terminal may control the function control to gradually slide toward the "ON" side. When the pressure applied on the "ON" side exceeds the second threshold, the function control is switched to the display manner shown in FIG. 2.

If the user completes the second input when the function control is in the third manner, the third manner is restored to the display manner of the function control before the second input, that is, restored to the display manner shown in FIG. 3.

If the user directly applies a pressure on the "OFF" side, even if a great pressure is applied on the "OFF" side, and the pressure is expanded to the "ON" side through the screen, causing the pressure on the "ON" side to exceed the second threshold, because the pressure on the "OFF" side is greater than the pressure on the "ON" side, the display manner of the function control is not switched, but the function control is still kept in the function state in which the function is turned off, that is, the display manner of the function control shown in FIG. 3 is kept.

If the user applies a pressure at the third position between the "ON" side and the "OFF" side, the display manner of the function control is determined and controlled according to a pressure expanded to the "ON" side and a pressure expanded to the "OFF" side from the applied pressure through the screen.

It is to be noted that, the user may set a parameter for the second threshold to set a simulated force parameter of the function control, or may determine the second threshold according to the type of a common switch control provided in the mobile terminal to determine the simulated force parameter of the function control.

Optionally, the first input is any one of the following:
a touch input for the first position or the second position;
a slide input from the first position to the second position; or
a slide input from the second position to the first position.

In addition, while responding to the first input or the second input, a sound prompt may be added to improve the sensory experience of the user, so that the user experience is more friendly and richer.

It is to be noted that, the various optional implementations described in the embodiments of the present invention may be implemented in combination with each other, or may be implemented individually, which is not limited in the embodiments of the present invention.

An electronic device according to an embodiment of the present invention is described below in detail.

Figure 9:
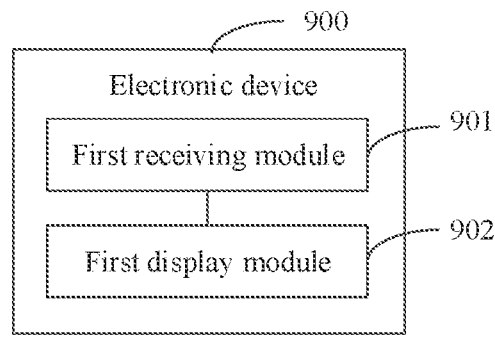
FIG. 9 is a structural diagram of an electronic device according to an embodiment of the present invention.

FIG. 9 is a structural diagram of the electronic device according to an embodiment of the present invention. As shown in FIG. 9, the electronic device 900 includes:

a first receiving module 901, configured to receive a first input for a function control in a case that the function control is displayed in a first manner; and a first display module 902, configured to: display, in response to the first input, the function control in a second manner, output a first current at a first position of the function control, and output a second current at a second position of the function control, where an input position of the first input includes at least one of the first position and the second position.

Optionally, the first display module 902 includes:
an obtaining unit, configured to obtain a first pressure value detected at the first position and a second pressure value detected at the second position in response to the first input; and a display unit, configured to display the function control in the second manner, output the first current at the first position of the function control, and output the second current at the second position of the function control, in a case that the second pressure value is greater than the first pressure value, and the second pressure value is greater than or equal to a first threshold.

Optionally, the electronic device further includes:
a second display module, configured to display the function control in a third manner, output a third current at the first position, and output a fourth current at the second position, in a case that the second pressure value is greater than the first pressure value, and the second pressure value is less than the first threshold, where the third current is equal to the fourth current.

Optionally, the second current is less than the first current, and the electronic device further includes:

a second receiving module, configured to receive a second input for the function control; and a third display module, configured to: display, in response to the second input, the function control in the first manner, output a fifth current at the first position, and output a sixth current at the second position, where the fifth current is less than the sixth current.

Optionally, the first input is any one of the following:
a touch input for the first position or the second position;
a slide input from the first position to the second position; or
a slide input from the second position to the first position.

The electronic device according to this embodiment of the present invention can implement each process implemented by the electronic device in the foregoing method embodiment. To avoid repetition, details are not described herein again.

Figure 10:
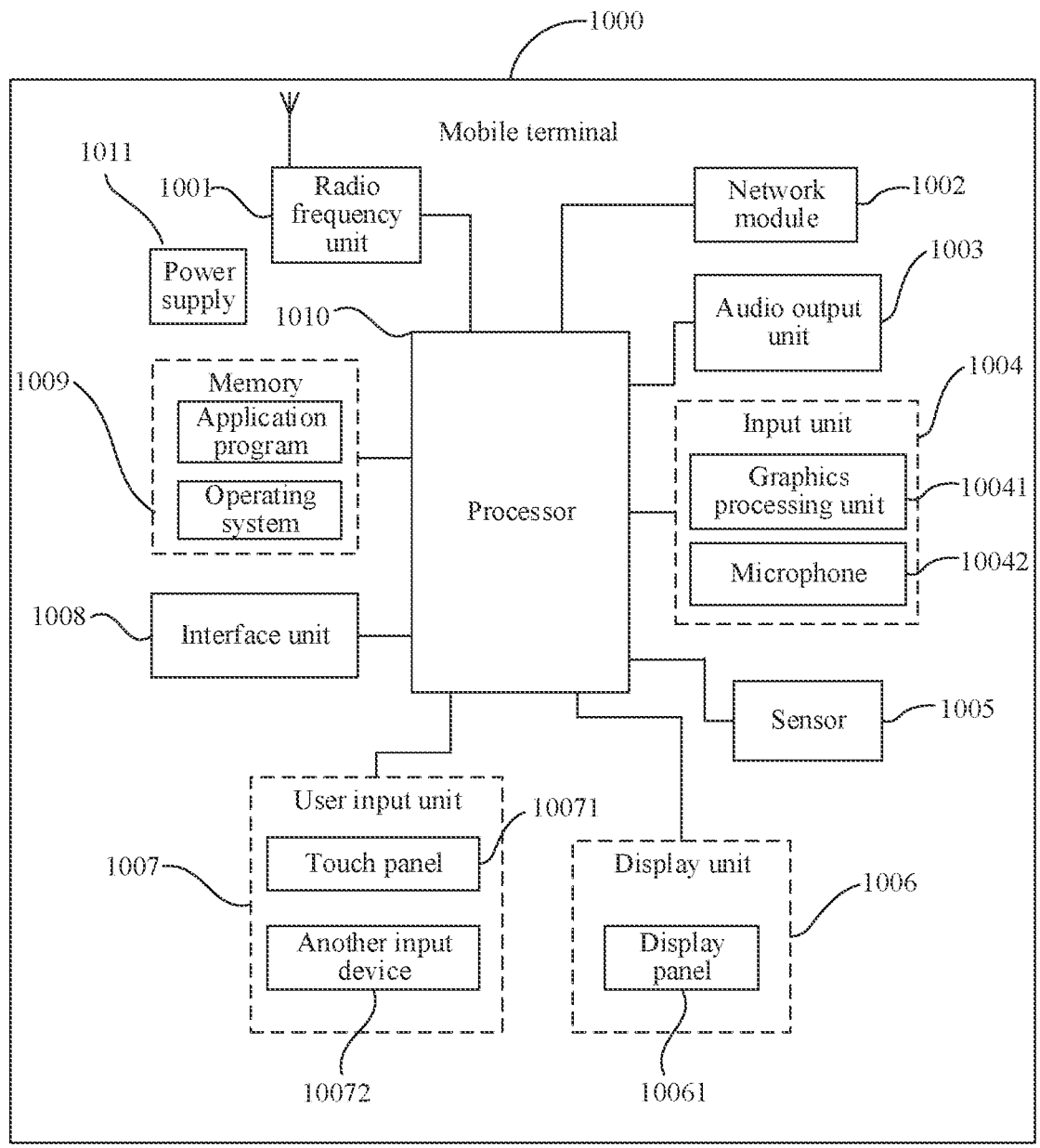
FIG. 10 is a schematic diagram of a hardware structure of a mobile terminal for implementing various embodiments of the present invention.

The electronic device may be a mobile terminal. FIG. 10 is a schematic diagram of a hardware structure of a mobile terminal for implementing various embodiments of the present invention.

The mobile terminal 1000 includes, but is not limited to, a radio frequency unit 1001, a network module 1002, an audio output unit 1003, an input unit 1004, a sensor 1005, a display unit 1006, a user input unit 1007, an interface unit 1008, a memory 1009, a processor 1010, a power supply 1011, and other components. A person skilled in the art may understand that a mobile terminal structure shown in FIG. 10 does not constitute a limitation on a mobile terminal, and the mobile terminal may include more or fewer components than shown, or combine some components, or have different component arrangements. In an embodiment of the present invention, the mobile terminal includes, but is not limited to, a mobile phone, a tablet computer, a notebook computer, a palmtop computer, an in-vehicle terminal, a wearable device, a pedometer, and the like.

The processor 1010 is configured to:

receive a first input for a function control in a case that the function control is displayed in a first manner; and display, in response to the first input, the function control in a second manner, output a first current at a first position of the function control, and output a second current at a second position of the function control, where an input position of the first input includes at least one of the first position and the second position.

Optionally, the processor 1010 is further configured to:

obtain a first pressure value detected at the first position and a second pressure value detected at the second position in response to the first input; and display the function control in the second manner, output the first current at the first position of the function control, and output the second current at the second position of the function control, in a case that the second pressure value is greater than the first pressure value, and the second pressure value is greater than or equal to a first threshold.

Optionally, the processor 1010 is further configured to:

display the function control in a third manner, output a third current at the first position, and output a fourth current at the second position, in a case that the second pressure value is greater than the first pressure value, and the second pressure value is less than the first threshold, where the third current is equal to the fourth current.

Optionally, the second current is less than the first current, and the processor 1010 is further configured to:

receive a second input for the function control; and display, in response to the second input, the function control in the first manner, output a fifth current at the first position, and output a sixth current at the second position, where the fifth current is less than the sixth current.

Optionally, the first input is any one of the following:

a touch input for the first position or the second position;

a slide input from the first position to the second position; or a slide input from the second position to the first position.

It is to be understood that, in this embodiment of the present invention, the radio frequency unit 1001 may be configured to transmit and receive information or transmit and receive signals during a call. Specifically, the radio frequency unit 1001 is configured to receive downlink data from a base station and transmit the downlink data to the processor 1010 for processing. In addition, the radio frequency unit 1001 transmits uplink data to the base station. Generally, the radio frequency unit 1001 includes, but is not limited to, an antenna, at least one amplifier, a transceiver, a coupler, a low noise amplifier, a duplexer, and the like. In addition, the radio frequency unit 1001 may further communicate with another device through a wireless communication system and a network.

The mobile terminal provides the user with wireless broadband Internet access through the network module 1002, such as helping the user to send and receive emails, browse web pages, and access streaming media.

The audio output unit 1003 may convert audio data received by the radio frequency unit 1001 or the network module 1002 or stored in the memory 1009 into audio signals, and output the audio signals as sounds. In addition, the audio output unit 1003 may further provide an audio output (such as a call signal receiving sound or a message receiving sound) related to a specific function executed by the mobile terminal 1000. The audio output unit 1003 includes a speaker, a buzzer, a receiver, and the like.

The input unit 1004 is configured to receive an audio or video signal. The input unit 1004 may include a graphics processing unit (GPU) 10041 and a microphone 10042. The graphics processing unit 10041 performs processing on image data of a static picture or a video acquired by an image acquisition apparatus (for example, a camera) in a video acquisition mode or an image acquisition mode. A processed image frame may be displayed on the display unit 1006. The image frame processed by the graphics processing unit 10041 may be stored in the memory 1009 (or another storage medium) or sent through the radio frequency unit 1001 or the network module 1002. The microphone 10042 may receive a sound and can process the sound into audio data. The processed audio data may be converted, in a phone call mode, into a format that can be sent to a mobile communication base station through the radio frequency unit 1001 to output.

The mobile terminal 1000 further includes at least one sensor 1005, such as an optical sensor, a motion sensor, and other sensors. Specifically, the optical sensor includes an ambient light sensor and a proximity sensor. The ambient light sensor may adjust luminance of the display panel 10061 according to luminance of the ambient light, and the proximity sensor may switch off the display panel 10061 and/or backlight when the mobile terminal 1000 is moved to the ear. As a type of the motion sensor, an accelerometer sensor may detect a magnitude of acceleration in various directions (generally, on three axes), may detect a magnitude and a direction of gravity when the accelerometer sensor is stationary, and may be configured to recognize a mobile terminal gesture (such as horizontal and vertical screen switching, a related game, and magnetometer posture calibration), a function related to vibration recognition (such as a pedometer and a knock), and the like. The sensor 1005 may further include a fingerprint sensor, a pressure sensor, an iris sensor, a molecular sensor, a gyroscope, a barometer, a hygrometer, a thermometer, an infrared sensor, and the like, which is not described herein in detail.

The display unit 1006 is configured to display information inputted by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive inputted digit or character information, and generate a keyboard signal input related to the user setting and function control of the mobile terminal. Specifically, the user input unit 1007 includes a touch panel 10071 and another input device 10072. The touch panel 10071, which is also referred to as a touchscreen, can collect a touch operation of the user on or near the touch panel (for example, an operation of the user on or near the touch panel 10071 by using any suitable object or attachment such as a finger or a touch pen). The touch panel 10071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 1010. Moreover, the touch controller receives a command transmitted by the processor 1010 and executes the command. In addition, the touch panel 10071 may be implemented in various types, such as a resistive type, a capacitance type, an infrared type, and a surface acoustic wave type. In addition to the touch panel 10071, the user input unit 1007 may further include the another input device 10072. Specifically, the another input device 10072 may include, but is not limited to, a physical keyboard, a function key (for example, a volume control key or a switch key), a track ball, a mouse, and a joystick, which is not described herein in detail.

Furthermore, the touch panel 10071 may cover the display panel 10061. After detecting a touch operation on or near the touch panel 10071, the touch panel 10071 transfers the touch operation to the processor 1010, to determine a type of a touch event. Then, the processor 1010 provides a corresponding visual output on the display panel 10061 according to the type of the touch event. In FIG. 10, the touch panel 10071 and the display panel 10061 are used as two independent parts to implement input and output functions of the mobile terminal. However, in some embodiments, the touch panel 10071 and the display panel 10061 may be integrated to implement the input and output functions of the mobile terminal, which is not specifically limited herein.

The interface unit 1008 is an interface for connecting an external apparatus and the mobile terminal 1000. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 1008 may be configured to receive an input (such as data information or electric power) from an external apparatus and transmit the received input to one or more elements in the mobile terminal 1000, or may be configured to transmit data between the mobile terminal 1000 and the external apparatus.

The memory 1009 may be configured to store a software program and various data. The memory 1009 may mainly include a program storage area and a data storage area. The program storage area may store an operating system, an application program required by at least one function (for example, a sound playback function and an image display function), and the like. The data storage area may store data (for example, audio data and a phone book) created according to use of the mobile phone. In addition, the memory 1009 may include a high speed random access memory, and may further include a non-volatile memory, such as at least one magnetic disk storage device, a flash memory device, or other non-volatile solid state storage devices.

The processor 1010 is the control center of the mobile terminal, and is connected to various parts of the entire mobile terminal by using various interfaces and lines. The processor 1010 runs or executes a software program and/or module stored in the memory 1009, and invokes data stored in the memory 1009, to execute various functions and data processing of the mobile terminal, thereby performing overall monitoring on the mobile terminal. The processor 1010 may include one or more processing units. Optionally, the processor 1010 may integrate an application processor and a modem processor. The application processor mainly processes an operating system, a user interface, an application program, and the like. The modem processor mainly processes wireless communication. It may be understood that the modem processor may alternatively not be integrated into the processor 1010.

The mobile terminal 1000 may further include the power supply 1011 (for example, a battery) for supplying power to the components. Optionally, the power supply 1011 may be logically connected to the processor 1010 by a power management system, thereby implementing functions such as charging, discharging, and power consumption management by using the power management system.

In addition, the mobile terminal 1000 includes some functional modules that are not shown, which are not described herein in detail.

Optionally, the embodiments of the present invention further provide a mobile terminal, including a processor 1010, a memory 1009, and a computer program stored in the memory 1009 and executable on the processor 1010, where the computer program, when executed by the processor 1010, implements each process of the embodiments of the foregoing control method, and can achieve the same technical effects. To avoid repetition, details are not described herein again.

The embodiments of the present invention further provide a computer-readable storage medium, storing a computer program, where the computer program, when executed by a processor, implements each process of the embodiments of the foregoing control method, and can achieve the same technical effect. To avoid repetition, details are not described herein again. The computer-readable storage medium is, for example, a read-only memory (ROM for short), a random access memory (RAM for short), a magnetic disk, or an optical disc.

A person of ordinary skill in the art may be aware that, the units and algorithm steps of the examples described with reference to the embodiments disclosed in this specification can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it is not to be considered that the implementation goes beyond the scope of the present invention.

A person skilled in the art may clearly understand that, for the purpose of convenient and brief description, for specific working processes of the foregoing described system, apparatus, and unit, reference may be made to the corresponding processes in the foregoing method embodiments, and details are not described herein again.

In the embodiments provided in this application, it is to be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated. The components displayed as units may or may not be physical units, that is, may be located in one place or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may be physically separated, or two or more units may be integrated into one unit.

If implemented in the form of software functional units and sold or used as an independent product, the functions may also be stored in a computer-readable storage medium. Based on such an understanding, the technical solutions of the present invention essentially, or the part contributing to the prior art, or the part of the technical solution, may be implemented in a form of a software product. The computer software product is stored in a storage medium, and includes several instructions for instructing a computer device (which may be a personal computer, a server, a network device, or the like) to perform all or some of the steps of the method described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. A control method, performed by an electronic device, the method comprising:
    receiving a first input for a function control in a case that the function control is displayed in a first manner;
    obtaining a first pressure value detected at a first position of the function control and a second pressure value detected at a second position of the function control in response to the first input; and
    displaying the function control in a second manner, outputting a first current at the first position of the function control, and outputting a second current at the second position of the function control, in a case that the second pressure value is greater than the first pressure value, and the second pressure value is greater than or equal to a first threshold; wherein
    an input position of the first input comprises the second position, or the input position of the first input comprises the first position and the second position.

2. The method according to claim 1, wherein after the obtaining a first pressure value detected at a first position of the function control and a second pressure value detected at a second position of the function control, the method further comprises:
    displaying the function control in a third manner, outputting a third current at the first position, and outputting a fourth current at the second position, in a case that the second pressure value is greater than the first pressure value, and the second pressure value is less than the first threshold, wherein
    the third current is equal to the fourth current.

3. The method according to claim 2, wherein the second current is less than the first current, and after the displaying, the function control in a second manner, outputting a first current at the first position of the function control, and outputting a second current at the second position of the function control, the method further comprises:
    receiving a second input for the function control; and
    displaying, in response to the second input, the function control in the first manner, outputting a fifth current at the first position, and outputting a sixth current at the second position, wherein
    the fifth current is less than the sixth current.

4. The method according to claim 1, wherein the second current is less than the first current, and after the displaying the function control in a second manner, outputting a first current at the first position of the function control, and outputting a second current at the second position of the function control, the method further comprises:
    receiving a second input for the function control; and
    displaying, in response to the second input, the function control in the first manner, outputting a fifth current at the first position, and outputting a sixth current at the second position, wherein
    the fifth current is less than the sixth current.

5. The method according to claim 1, wherein the first input is any one of the following:
    a touch input for the first position or the second position;
    a slide input from the first position to the second position; or
    a slide input from the second position to the first position.

6. An electronic device, comprising a processor, a memory, and a computer program stored in the memory and executable on the processor, the computer program, when executed by the processor, implementing the steps of:
    receiving a first input for a function control in a case that the function control is displayed in a first manner;
    obtaining a first pressure value detected at a first position of the function control and a second pressure value detected at a second position of the function control in response to the first input; and
    displaying the function control in a second manner, outputting a first current at the first position of the function control, and outputting a second current at the second position of the function control, in a case that the second pressure value is greater than the first pressure value, and the second pressure value is greater than or equal to a first threshold; wherein
    an input position of the first input comprises the second position, or the input position of the first input comprises the first position and the second position.

7. The electronic device according to claim 6, wherein the computer program, when executed by the processor, further implements the following step after the step of obtaining a first pressure value detected at a first position of the function control and a second pressure value detected at a second position of the function control:
    displaying the function control in a third manner, outputting a third current at the first position, and outputting a fourth current at the second position, in a case that the second pressure value is greater than the first pressure value, and the second pressure value is less than the first threshold, wherein
    the third current is equal to the fourth current.

8. The electronic device according to claim 7, wherein the second current is less than the first current, and the computer program, when executed by the processor, further implements the following step after the step of the displaying the function control in a second manner, outputting a first current at the first position of the function control, and outputting a second current at the second position of the function control:

receiving a second input for the function control; and displaying, in response to the second input, the function control in the first manner, outputting a fifth current at the first position, and outputting a sixth current at the second position, wherein the fifth current is less than the sixth current.

9. The electronic device according to claim 6, wherein the second current is less than the first current, and the computer program, when executed by the processor, further implements the following step after the step of the displaying the function control in a second manner, outputting a first current at the first position of the function control, and outputting a second current at the second position of the function control:

receiving a second input for the function control; and displaying, in response to the second input, the function control in the first manner, outputting a fifth current at the first position, and outputting a sixth current at the second position, wherein the fifth current is less than the sixth current.

10. The electronic device according to claim 6, wherein the first input is any one of the following:

a touch input for the first position or the second position;

a slide input from the first position to the second position; or a slide input from the second position to the first position.

11. A non-transitory computer-readable storage medium, storing a computer program, the computer program, when executed by a processor, implementing the steps of:

receiving a first input for a function control in a case that the function control is displayed in a first manner;

obtaining a first pressure value detected at a first position of the function control and a second pressure value detected at a second position of the function control in response to the first input; and displaying the function control in a second manner, outputting a first current at the first position of the function control, and outputting a second current at the second position of the function control, in a case that the second pressure value is greater than the first pressure value, and the second pressure value is greater than or equal to a first threshold; wherein an input position of the first input comprises the second position, or the input position of the first input comprises the first position and the second position.

12. The storage medium according to claim 11, wherein the computer program, when executed by the processor, further implements the following step after the step of obtaining a first pressure value detected at a first position of the function control and a second pressure value detected at a second position of the function control:

displaying the function control in a third manner, outputting a third current at the first position, and outputting a fourth current at the second position, in a case that the second pressure value is greater than the first pressure value, and the second pressure value is less than the first threshold, wherein the third current is equal to the fourth current.

13. The storage medium according to claim 12, wherein the second current is less than the first current, and the computer program, when executed by the processor, further implements the following step after the step of the displaying, in response to the first input, the function control in a second manner, outputting a first current at a first position of the function control, and outputting a second current at a second position of the function control:

receiving a second input for the function control; and displaying, in response to the second input, the function control in the first manner, outputting a fifth current at the first position, and outputting a sixth current at the second position, wherein the fifth current is less than the sixth current.

14. The storage medium according to claim 11, wherein the second current is less than the first current, and the computer program, when executed by the processor, further implements the following step after the step of the displaying the function control in a second manner, outputting a first current at the first position of the function control, and outputting a second current at the second position of the function control:

receiving a second input for the function control; and displaying, in response to the second input, the function control in the first manner, outputting a fifth current at the first position, and outputting a sixth current at the second position, wherein the fifth current is less than the sixth current.

15. The storage medium according to claim 11, wherein the first input is any one of the following:

a touch input for the first position or the second position;

a slide input from the first position to the second position; or a slide input from the second position to the first position.

* * * * *